Aug. 31, 1926.

R. A. WEAGANT 1,597,848

METHOD AND APPARATUS FOR RADIO SIGNALING

Filed Oct. 6, 1920     4 Sheets-Sheet 1

INVENTOR
Roy A. Weagant
BY
his ATTORNEY

Aug. 31, 1926.
R. A. WEAGANT
METHOD AND APPARATUS FOR RADIO SIGNALING
Filed Oct. 6, 1920
1,597,848
4 Sheets-Sheet 2
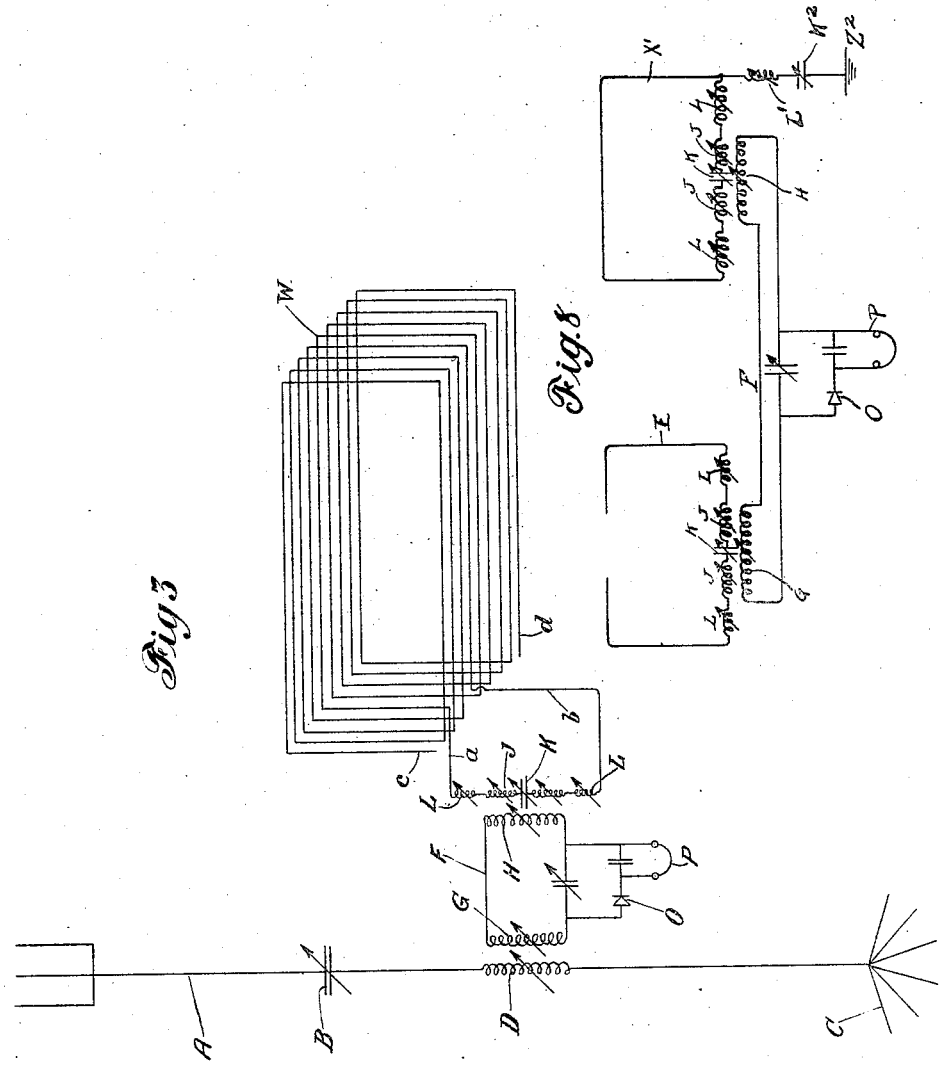
INVENTOR
Roy A. Weagant
BY Ira J Adams
his ATTORNEY

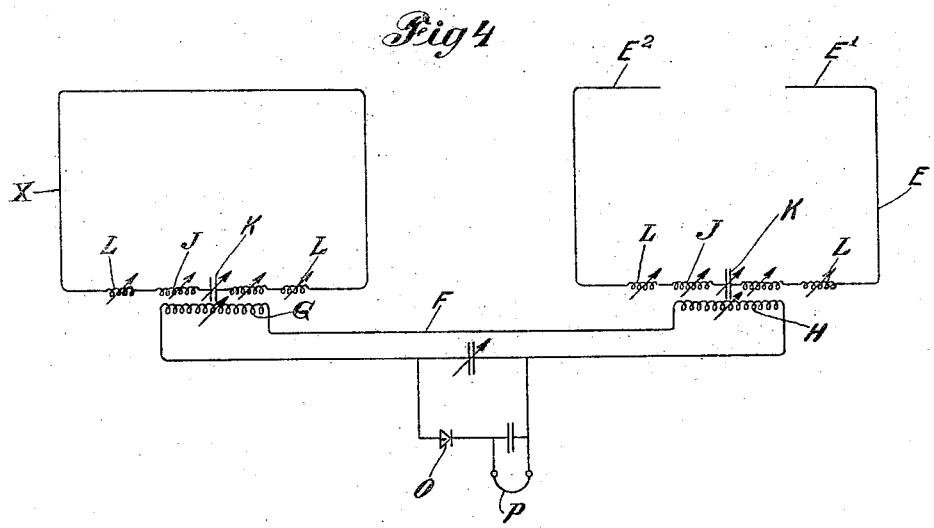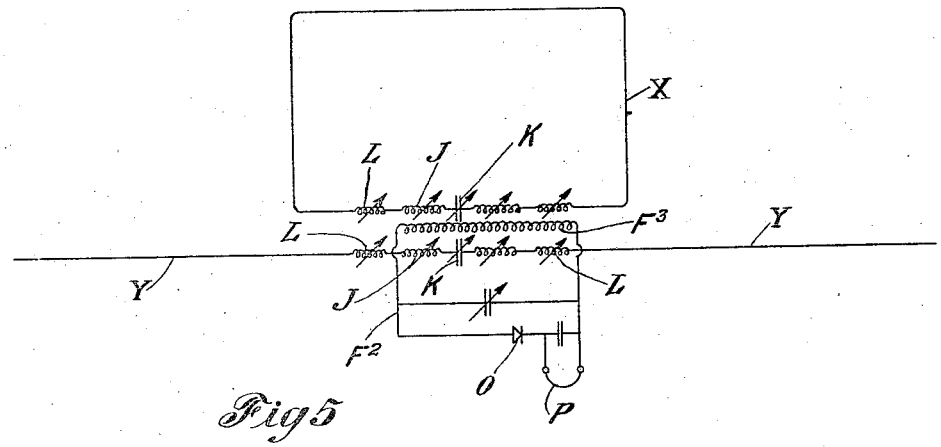

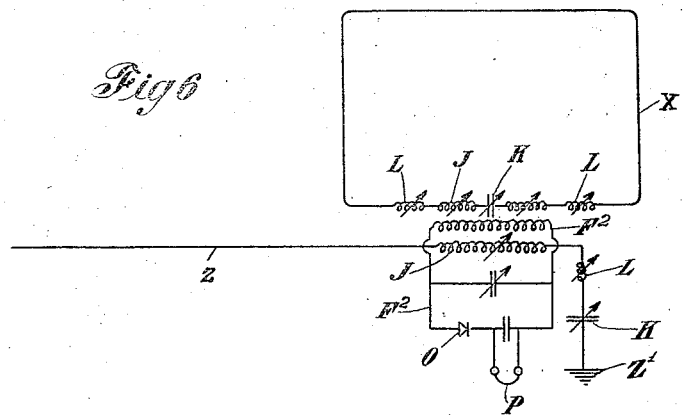
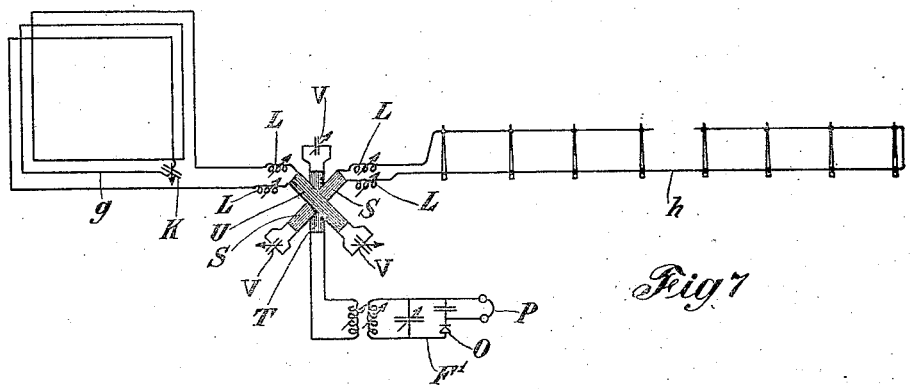

Patented Aug. 31, 1926.

1,597,848

UNITED STATES PATENT OFFICE.

ROY A. WEAGANT, OF NEW YORK, N. Y., ASSIGNOR TO RADIO CORPORATION OF AMERICA, A CORPORATION OF DELAWARE.

METHOD AND APPARATUS FOR RADIOSIGNALING.

Application filed October 6, 1920. Serial No. 415,082.

This invention relates to radio signaling, but more particularly to a method and apparatus for minimizing the interference of static disturbances in radio reception.

In my copending application Serial #275,556, filed February 7, 1919, I have referred to certain facts which I have discovered in regard to the properties of different types of aerials, when associated as therein shown and described or in equivalent manner, for the purpose of reducing static interference and in my application Serial #181,458 I have disclosed arrangements involving the separation of the antenna by a fraction of a wave length for the same purpose.

Antennæ of different forms have different properties in respect to their modes of drawing energy from signal and static impulses, and the phase and direction of currents produced in them is differently affected by the character and direction of transmission of such impulses. In my applications referred to, I utilize these differences to at least to a large extent cancel static and retain the signal from one half of the horizon.

Recognized antennæ are of two types, those behaving as a vertical open aerial, exemplified by a vertical wire, and those behaving as a closed circuit, exemplified by a closed loop of one or more turns. It is well known that a vertical open antenna, for example, receives horizontally propagated signal waves equally well and with like effect from all directions. It is also known that such an antenna, whether grounded directly or through a counterpose, will also receive static impulses, but why this is so, I have as yet been unable to ascertain. On the other hand, a closed loop antenna, for example, or system of loops, is differently affected by the direction of arrival of signal waves, and from purely theoretical grounds, I believe it probable that it is also differently affected by static impulses, in accordance with the nature and character of said impulses, as for instance, when their direction of polarization changes.

In accordance with the invention disclosed in my application Serial No. 275,556 above referred to, I have been able to geometrically combine the effects of the antenna currents in a vertical open antenna and a closed loop, on a common detector circuit associated therewith, and materially reduce the effects of static and other interference. In that application I have also shown other means of utilizing different properties of antennæ of different forms to secure static and signal currents having phase differences in order to retain the signals and substantially eliminate static.

I have made the further discovery that opening a loop antenna apparently causes it to produce currents in a different way from a closed loop, while grounding a closed loop may cause it to draw energy after the manner of a vertical open antenna, even though tuned and operated as a loop. I have found that an open loop receives signal waves in substantially the same way as a closed loop, but receives static impulses in substantially the same way as a vertical open aerial or vertical wire.

In the claims and specification the term "recognized type of antenna" will be used to refer to vertical type antenna, closed loop type antenna and other antennæ which draw energy from both the signal and static waves in a manner similar to that of either. The term "intermediate type of antenna" will be used to refer to antennæ which draw energy from the signal waves in the same manner as the closed loop type and draw energy from the static waves in a manner similar to the vertical type, or vice versa.

It appears that the relative phase of signal and static currents of a loop antenna or an antenna acting as a loop, is altered by opening the loop.

Such an open loop and other modifications of antenna structure to be described, may be utilized to affect the relative phases of currents due to signals, and vice versa, thus in effect producing antennæ intermediate in their properties between the vertical open form of aerial and the closed loop form, or structures possessing some of the properties of both of said recognized forms of aerials. These antenna structures, which for lack of a better term at present will be called "intermediate" forms, may be constructed in various ways, and take advantage of phase relations thus produced to retain signal and substantially eliminate static. In accordance with the invention fractional wave length separation may be used in combination with the intermediate antenna forms.

Suitable preferred forms of apparatus for carrying out the method of this invention are shown in the accompanying drawings, in which, Fig. 1 is a diagrammatic representation of circuits and apparatus showing an antenna system having one portion in the form of a vertical open antenna and another portion in the form of an open loop;

Fig. 3 is a similar view of a modification in which the open loop is shown with a plurality of turns in the form of a cage;

Fig. 4 is a similar view of a modification in which the antenna portions are in the form of a closed loop and an open loop respectively;

Fig. 5 is a similar view of a modification in which the antenna portions are in the form of a closed loop and a horizontally extending linear oscillator;

Fig. 6 is a similar view of a modification in which the antenna portions are in the form of a closed loop and a horizontally extended grounded aerial respectively; and Fig. 7 is another view of a modification showing a long low open loop as an antenna.

Fig. 8 is a diagrammatic representation of a modification in which the antenna portions are in the form of an open loop and a grounded loop.

Figure 1:
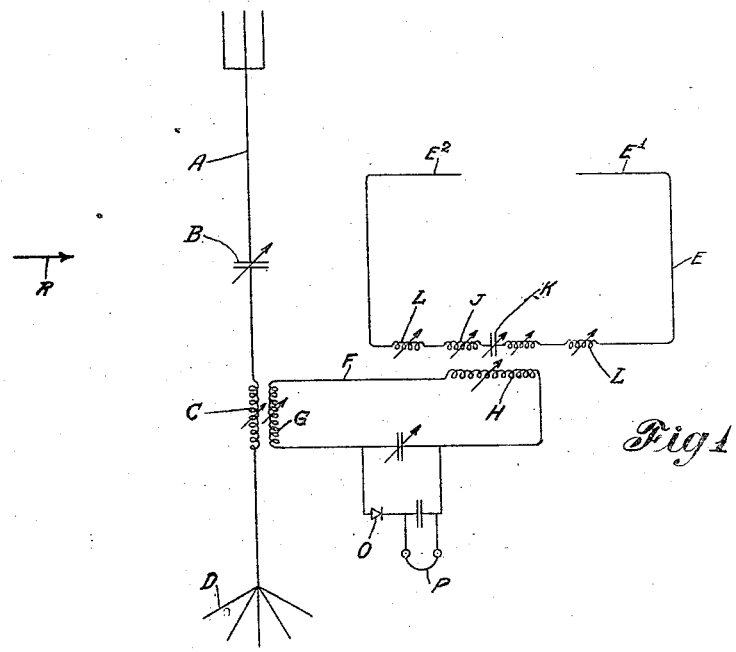

Referring to the drawings, A represents an antenna, shown in this instance as a vertical open antenna, in which currents will be set up in like direction, regardless of the horizontal direction from which the signals come. The antenna A has preferably connected in circuit therewith the usual variable condenser B, the variable coupling coil C, and the antenna may be connected to a suitable counterpoise D as shown. Such a vertical antenna, I have found, picks up static, but is largely indifferent to the mode of propagation of such impulses.

Another type of antenna, shown in this instance in Fig. 1, as an open loop antenna E, is associated with the antenna A at the receiving station. Such an open loop antenna, I have found, draws energy from signal waves in substantially the same way as a closed loop, that is, for instance, it receives best when its plane points towards the transmitter, will not receive at all if the signal comes at right angles to its plane, and will have its current reversed if the signal is in its plane, but from the opposite direction to that first assumed. A loop antenna, whether closed or open, is thus differently affected by the azimuthal direction of vertically polarized horizontal propagated waves and is differently responsive thereto in accordance with the direction of approach of said waves. Either a single loop or a loop having a plurality of turns may be used as desired, and this applies to both the closed and open loops shown in the drawings and described herein. The open loop E may be constructed with one or a plurality of wires at E' and E² in a substantially horizontal plane.

I have found that the open loop E, instead of behaving like a closed loop in respect to static impulses, apparently draws energy from static impulses in substantially the same manner as a recognized antenna of the vertical open type shown at A. By reason of such inherent properties of an antenna of the intermediate form, which may be an open loop for example, I am able in effect to obtain a phase difference of 90° for signals between the antennæ portions A and E when both portions are substantially the same distance from the source of signals while the static effects will largely be in phase. The signal and static currents set up in the antenna portions may then be geometrically combined by suitable means to retain the signal and substantially eliminate the static. One arrangement for effecting this is shown in Fig. 1 where the detector circuit F is coupled to the vertical antenna A by means of the suitable variable coupling coils C and G, and coupled to the open loop E by means of the variable coupling coils H and J. A variable tuning condenser K is, in this instance, inserted preferably midway in the length of the coupling coil J, and tuning elements in the form of variable inductances L are shown in the circuit of the open loop E. The detector O and telephones P are shown connected in the usual manner in the detector circuit.

In the operation of the system so far described, let it be assumed that the antenna portion E is arranged substantially in the position indicated in Fig. 1 with reference to the antenna portion A, and that signals are coming from the direction indicated by the arrow Q. The antenna portions A and E are tuned to the incoming signal and the variable elements of the system are properly adjusted to balance out static, in so far as it is of a nature to produce this result, and retain the signals. Since the potentials due to static are then in phase in the two antennæ if the signals came from the other half of the horizon in the direction indicated by the arrow R, the combined aerial system would receive from that direction equally well. Due to the relative phase differences of signal and static currents in the vertical and closed loop, when static is opposed, signals in the two portions are in phase, but with the present arrangement when static is opposed the signals are combined at right angles. This combined aerial system is therefore not blind to signals from one half of the horizon due to the association and adjustment of the antennæ. The adjustment to balance out static is done by means of the variable elements L, J, K, or part of them and by proper coupling between the coupling coils C, G and H, J which should not be too close. Just what the actual result of these adjustments is I do not know. In some cases it is apparently a detuning sufficient to dephase the static currents so as to bring them into opposition. In others it may be a change in current distribution amounting to an effective change of phase without actual change of period, due to opposite changes of inductance and capacity. Whatever the explanation may be, it accomplishes the result and without a large loss of signal such as would be expected from a considerable detuning. I may, however, use other arrangements for phase adjustments.

Figure 2:
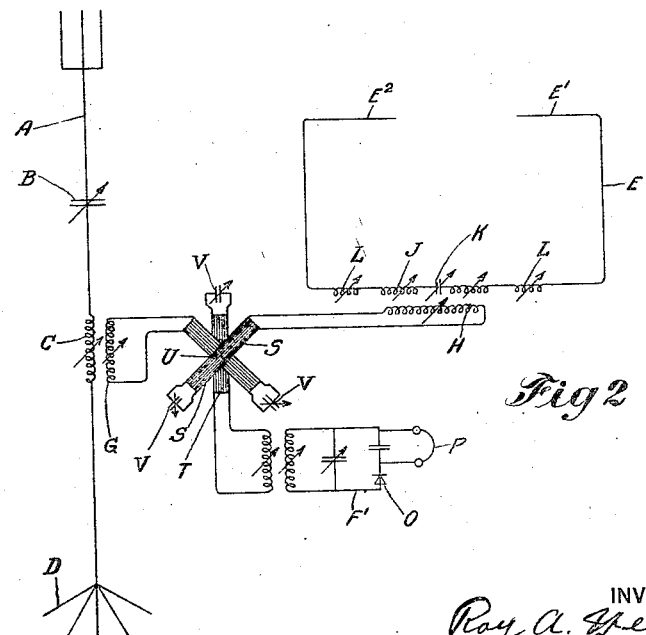
Fig. 2 is a similar view of a modification of Fig. 1 showing the two antenna portions connected through a goniometer.

In Fig. 2 a modification is shown in which the antenna portions A and E are associated by means of a radio goniometer having the fixed coils S and movable coil T which is pivoted for rotation about the axis U. Variable condensers V are preferably connected in circuit with the coils as shown, and the detector circuit F' is shown suitably coupled to the circuit of the movable coil T. The operation of the system is the same as that described for Fig. 1.

In Fig. 3 a modification is shown in which the open loop W is constructed with a plurality of turns preferably in the general form of a cage. The inner ends $a$ and $b$ of the cage are preferably connected to the coupling coil J and the turns or convolutions of the cage, of which there may be any desired number, may extend substantially parallel to each other as shown and terminate at the outer open ends $c$ and $d$, but I am not to be understood as limiting this multi-turn antenna to this construction, for the construction shown is only to be taken as an illustrative example of an aerial of the intermediate type hereinbefore referred to, which acts as though it receives static impulses in substantially the same phase as a vertical open aerial, but receives signal waves in substantially the same phase as a closed loop, if placed in the same relative position.

In Fig. 4 I have shown an antenna portion of recognized type, as a closed loop X associated with an antenna portion of intermediate type in the form of an open loop E. Both antenna portions are provided with tuning elements as shown and coupled to the detector circuit F. In this instance the recognized closed loop antenna X behaves as a closed loop, as might be expected, with respect to both signals and static, and the open loop antenna E also behaves as a closed loop with respect to signals, but apparently receives static in substantially the same way as a vertical open antenna, so that advantage may be taken of the relative phase relations thus produced to retain signals and substantially eliminate static.

In Fig. 5 I have shown a closed loop antenna portion X associated with another form of intermediate type aerial Y, acting as an open loop with respect to signals and static, but consisting, in this instance, of a horizontally extending linear oscillator, provided with a coupling coil J and tuning elements K and L, both aerials X and Y being coupled to the common detector circuit $F^2$ as by means of the coupling coil $F^3$. The recognized antenna X acts as a closed loop with respect to signals and static, but the antenna Y of intermediate type has the properties of an open loop with respect to its mode of drawing energy from signal and static impulses, that is, it receives signals in substantially the same way as a closed loop, but receives static impulses in substantially the same way as a vertical open aerial. The aerial Y should preferably not be buried or directly upon the earth.

In Fig. 6 I have shown a closed loop X associated with an intermediate type aerial Z in the form of a horizontally extending antenna grounded at Z' and tuned by means of suitable tuning elements K and L in the ground connection. Both the loop X and the horizontally extending antenna Z are coupled as shown to the common detector circuit $F^2$. The antenna Z, I have found, behaves as an open loop with respect to signals and static.

In Fig. 8 I have shown an open loop E associated with an aerial in the form of a loop X' grounded at $Z^2$ through inductance L' and capacity $K^2$. In this modification the grounded loop acts as a vertical antenna.

I am unable, with the information I now possess, to fully account theoretically for the operation of the intermediate type of aerial with respect to signals and static. My invention is, however, based on known facts as observed and recorded by me, and I have actually obtained the results stated herein with a highly satisfactory degree of static elimination, using apparatus as diagrammatically shown. Without attempting at this time to give a theroretical explanation of the action of the open loop or intermediate type of aerial and the reactions between the antenna portions of different types shown in the drawings, I can only repeat that the open loop type seems to be neither a loop nor a vertical open aerial, but has properties intermediate between the two. In effect, in this intermediate type, the currents due to static disturbance are in phase with those generated in a vertical, open aerial, while the currents due to signal waves are in phase with those generated in a closed loop, so that there is 90° difference between such signal currents generated in the intermediate type and those generated in the vertical open aerial or in an aerial of the vertical open type. In those cases in which a closed loop is associated with an antenna of the intermediate type as in Figs. 4, 5 and 6, both antenna portions receive signal currents in the manner of a closed loop, so that the signal currents in effect will be in phase, but the currents due to static impulses in the antenna portions will be out of phase since the antenna portion of intermediate type receives static impulses in substantially the same manner as a vertical open aerial.

Instead of arranging both antenna portions near together at the receiving station and at substantially the same distance from the transmitting station, they may have an effective separation of an appreciable fraction of a wave length, as shown in Fig. 7, in which case the phases of the currents set up in the antennæ $g$ and $h$ by the signal waves will be affected by the degree of wave length separation of the antenæ so that antennæ of different types, one a recognized type and the other an intermediate type, as a closed loop or cage $g$ and a long low open loop $h$, which apparently draw energy from signal waves in the same manner, may be used. In Fig. 7 it may be assumed that the long low horizontally extending open loop $h$ is of sufficient length to produce appreciable fraction wave length separation between its mid point and the loop or cage $g$, whatever the location of the loop $g$, whether close to the station or removed to a distance therefrom and connected by leads to the station.

It will be obvious in view of the explanation in connection with Fig. 7 that fractional wave length separation may also be utilized with various combinations of antennæ of the type described to affect the phase relationship of signal. In accordance with my earlier application static is received substantially simultaneously by antennæ spaced a fraction of a wave length apart, so that the phase relation of static currents in the antenna is unaffected by utilizing fractional wave length separation in conjunction with the intermediate type of antenna. With ¼ fractional wave length separation the difference in phase between signal currents in the antennæ may be made in effect 180° difference in phase, while static is in phase or vice versa. In either case elimination of static is possible with retention of signal. It will be evident that the necessity for phase adjustments may then be eliminated.

I claim and desire to obtain by Letters Patent the following:

1. In a radio receiving system, a static reducing device comprising antenna portions of different types, one antenna portion being of a recognized type of aerial having properties with respect to signals and static similar to those of said type, and capable of drawing energy from both signal and static impulses after the recognized manner of said type of aerial, and the other antenna portion comprising an open loop possessing some of the properties of both a vertical open aerial and a closed loop with respect to signal and static impulses, and means associated with said antenna portions for geometrically combining the signal and static currents.

2. In a radio receiving system, a static reducing device comprising antenna portions of different types located in substantially the same position relative to received signals, one antenna portion being of a recognized type of aerial having properties with respect to signal and static similar to those of said type, and capable of drawing energy from both signal and static impulses after the recognized manner of said type of aerial, and the other antenna portion comprising an open loop and receiving signals in substantially the same manner as a closed loop but responding to static impulses in substantially the same manner as a vertical open aerial and means associated with said antenna portions for geometrically combining the signal and static currents.

3. In a radio receiving system, a static reducing device comprising antenna portions of different types located in substantially the same position relative to received signals, one of said antenna portions behaving in a recognized manner with respect to signals and static and the other antenna portion, having inherently different phase characteristics with respect to signals and static, and means associated with said antenna portions for geometrically combining the signal and static currents.

4. In a radio receiving system, a static reducing device comprising antenna portions of different types located in substantially the same position relative to received signals, one of said antenna portions being an open loop, and means for geometrically combining the signal and static currents.

5. In a radio receiving system, a static reducing device comprising antenna portions of different types located in substantially the same position relative to received signals, one of said antenna portions being an open loop having a plurality of turns, and means associated with said antenna portions for geometrically combining the signal and static currents.

6. In a radio receiving system a static reducing device comprising a closed loop, an aerial in the form of an open loop, means connecting the two aerials to form a single aerial system and for combining the signal and static currents set up in said aerial portions, for the purpose described.

ROY A. WEAGANT.